March 12, 1963
D. METTETAL, JR
3,080,721
POWER STEERING AND SHIFTING MECHANISMS
Original Filed Dec. 9, 1959
2 Sheets-Sheet 1
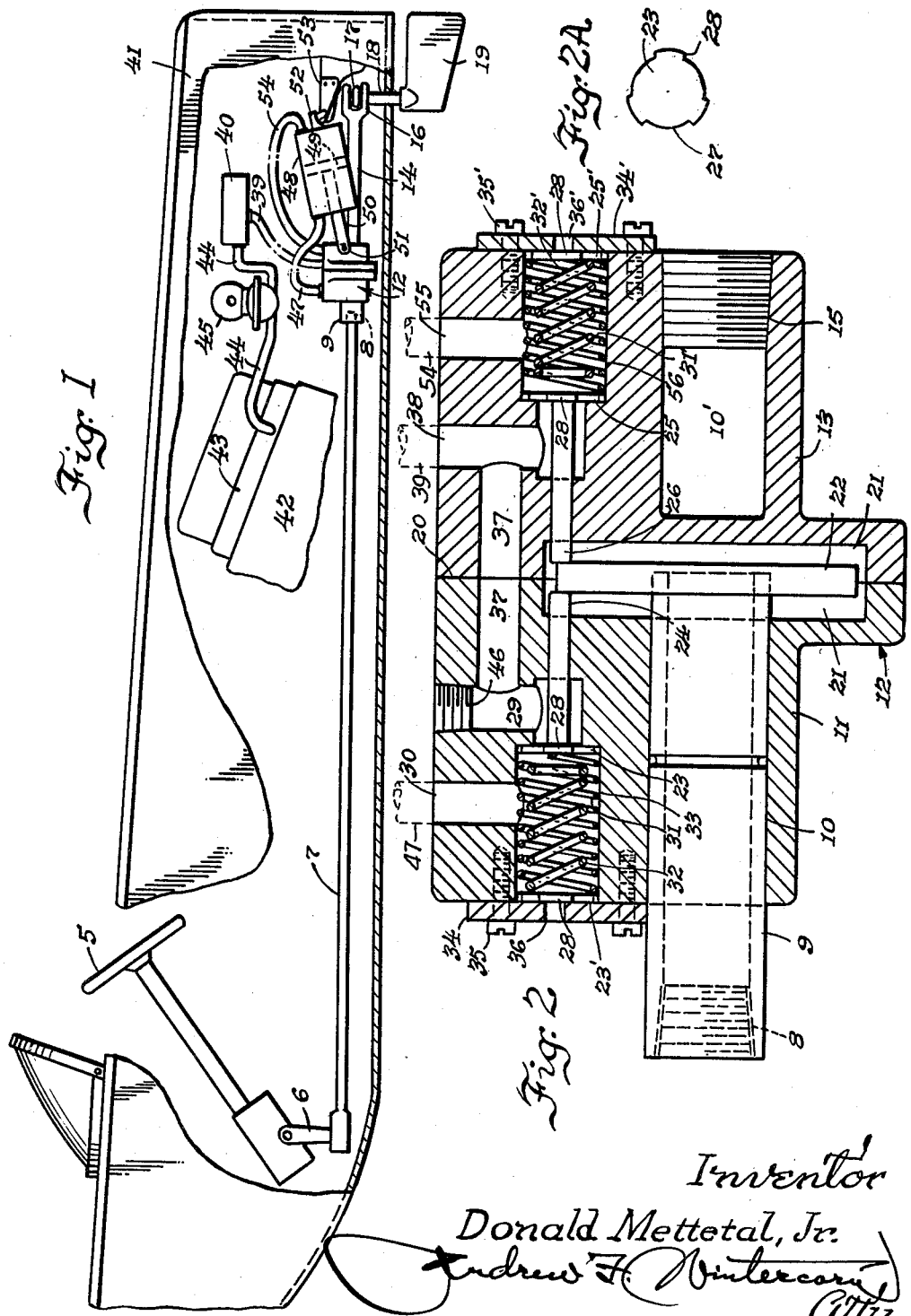
Inventor
Donald Mettetal, Jr.

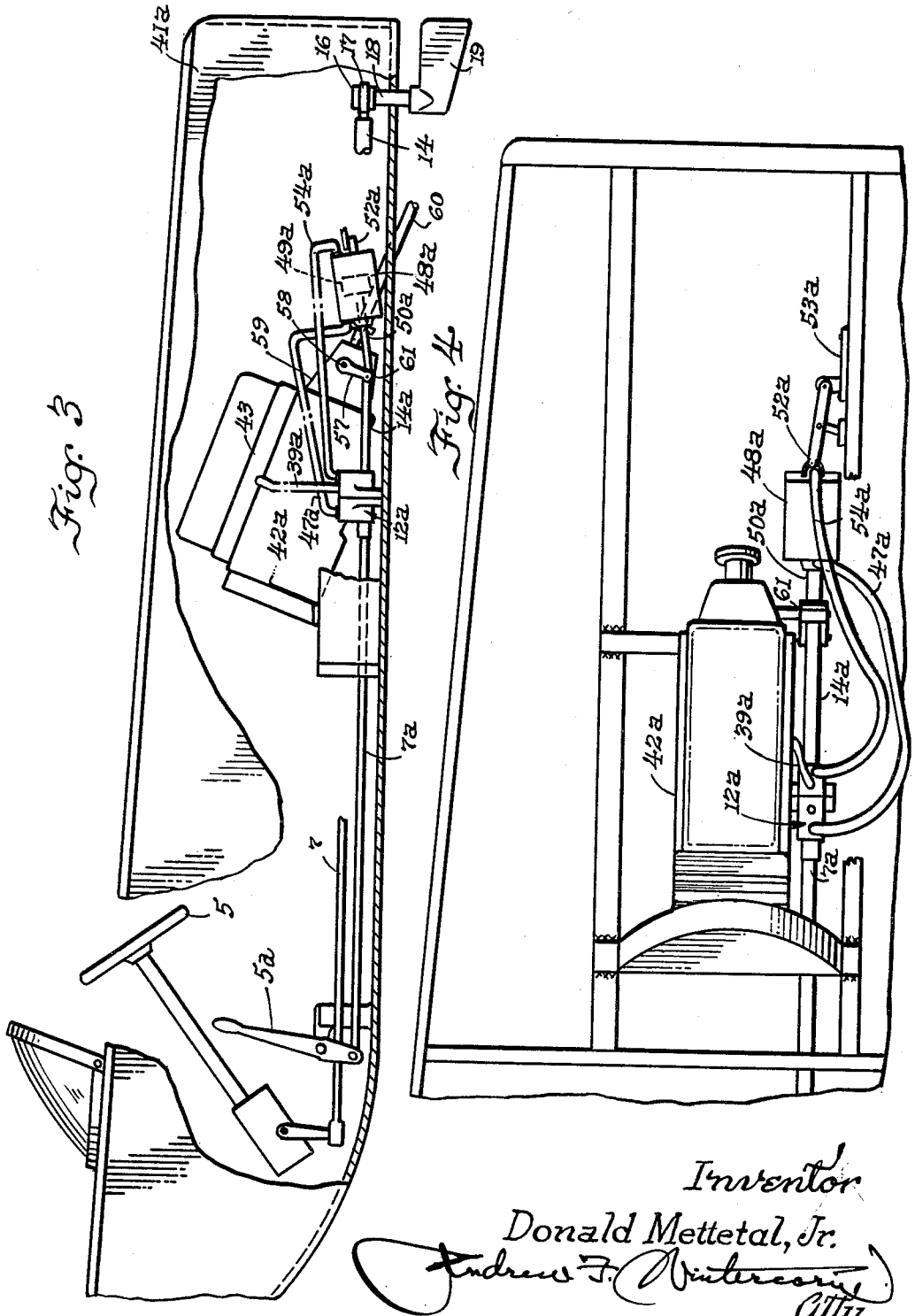

United States Patent Office 3,080,721
Patented Mar. 12, 1963

3,080,721
POWER STEERING AND SHIFTING MECHANISMS
Donald Mettetal, Jr., Rockford, Ill., assignor of one-half to Herbert W. Kasper, Rockford, Ill., and one-third to Andrew F. Wintercorn, Rockford, Ill.
Continuation of application Ser. No. 858,500, Dec. 9, 1959. Divided and this application Apr. 16, 1962, Ser. No. 190,844
29 Claims. (Cl. 60—60)

This application is a continuation of my copending application, Serial No. 858,500, filed December 9, 1959, now forfeited.

This invention relates to power steering and shifting mechanisms, especially designed for marine applications, but also useful otherwise, wherever power operation of a reciprocable member in response to manual operation of another reciprocable member is desired.

The principal object of my invention is to provide a simple, compact, and economical mechanism, quickly and easily installable in existing manually operable steering and shifting equipment to convert the same to easy power operation, and in such a way that the power operation is smooth and positive, as well as thoroughly safe and reliable.

A salient feature of the mechanisms of my invention, which are operated by atmospheric pressure, the same being connected with the intake manifold of an internal combustion engine as the suction or vacuum source, is the safety feature obtainable as a result of the slight amount of play in the mechanism between the manually operated rod and the rod normally operated under atmospheric pressure in response to movement of the manually operated rod, so that in the event of any failure of the vacuum means for any reason, the steering and/or shifting normally done with power can be taken care of manually until the failure has been rectified. When a boat is equipped with both power steering and power shifting, or only power steering, a storage tank is generally used together with a vacuum booster pump connected with the storage tank to insure adequate suction. Where there is power shifting alone, the engine idles at the time of shifting and there is accordingly ample suction available without the booster means. However, a storage tank and an electrically driven vacuum booster pump may nevertheless be provided in either case.

The invention is illustrated in the accompanying drawings, in which—

FIG. 1 is a longitudinal section through a motor boat equipped with a vacuum power steering mechanism made in accordance with my invention;

FIG. 2 is a longitudinal section through the full floating vacuum control valve assembly that is connected between the manually operated steering rod and the power operated steering rod when the existing full length rod has had an intermediate section thereof cut away to enable installation of this assembly;

FIG. 2a is a face view of one of the four disk valves shown in FIG. 2, the four being alike and interchangeable;

FIG. 3 is a view similar to FIG. 1 but showing a vacuum power shifting mechanism, it being, of course, evident that the steering rod, an intermediate portion of which is shown broken away, could be assumed to include the power steering valve assembly connecting the two sections thereof, the same as in FIG. 1, and FIG. 4 is a plan view of FIG. 3.

Similar reference numerals are applied to corresponding parts throughout the views.

Referring first to FIGS. 1 and 2, the reference numeral 5 designates the steering wheel which when turned in the usual way transmits oscillatory movement to the crank 6 in a fore and aft vertical plane, thereby giving endwise movement to the rod 7, the rear end of which is threaded for connection at 8 with a reciprocable valve operating or tappet member 9 slidable in a longitudinal bore 10 in the front half 11 of a vacuum control valve unit 12. The rear half 13 of the valve unit 12 has the steering rod 14 threadedly connected therewith at 15 in coaxially aligned relationship with the rod 7, and rod 14 has a pivotal clevis connection at 16 with the outer end of a radius arm 17 extending laterally from the upper end of a vertical rudder shaft 18 that operates the rudder 19. The two halves 11 and 13 of the control valve unit 12 are suitably die cast and are identical except for the difference in size of the bore 10 and the fact that it extends through the half 11, whereas the corresponding bore 10' in half 13 is a blind bore. The two halves 11 and 13 have flat abutting faces 20 and are suitably secured together by circumferentially spaced screws (not shown) so that cylindrical depressions 21 provided in the two halves define a cylindrical chamber in which a cylindrical cross-head 22 fixed to the inner end of the tappet member 9 is reciprocable to unseat one disk valve 23 by engagement with pin 24 upon forward movement of rod 7 or unseat another disk valve 25 by means of another pin 26 upon rearward movement of rod 7, and accordingly oscillate rudder 19 in one direction or the other from a straight ahead position, as will soon appear. Valve 23, which like valve 25 is in the form of a circular disk with intermediate arcuate portions 27 on the periphery thereof cut away to define arcuate openings between radially projecting guide fingers 28, controls communication between ports 29 and 30 in the valve body half 11. There are two telescoping coiled compression springs 31 and 32 in the cylindrical chamber 33 wherein the disk valve 23 is slidable on its fingers 28, the outer spring 31 being of larger diameter and longer and relatively light and tending normally to hold the valve 23 closed, but the inner spring 32 being of smaller diameter and shorter length than spring 31 and substantially heavier and adapted to serve only as a combination limiting stop and shock absorber for valves 23 and 23' disposed on opposite sides thereof. Disk valve 23' is at the opposite end of chamber 33 from valve 23 and, like valve 23, has the same radial guide fingers 28 thereon, this valve 23' being held normally seated by spring 31 against a closure plate 34 fastened by means of screws 35 to the valve body half 11, whereby normally to close an air relief port 36. Port 29 is connected through registering passages 37 with a port 38 in the other valve body half 13 connected by means of a flexible tube 39 with a vacuum storage tank 40 suitably supported in the rear portion of the boat 41 behind the engine 42. The latter has the usual intake manifold 43 with which a tube 44 extending to the storage tank 40 is connected, an electrically driven vacuum pump 45 being provided in the line 44 as a booster pump where needed. Tube 39 may be connected interchangeably to either of the ports 29 and 38, and when it is connected to port 38 a plug 46 is threaded in port 29. Port 30 is connected by means of a flexible tube 47 with one end of a working cylinder 48 in which a working piston 49 is reciprocable and has a rod 50 extending through a hole in the front end wall of the cylinder and pivotally connected at 51 to the body of the control valve unit 12. A projection 52 is provided on the other end of the cylinder 48 and is pivotally supported on a shelf 53 provided therefor in the rear end of the boat 41. Another flexible tube 54 connects the rear end of the the cylinder 48 with another port 55 similar to port 40 provided in the other end of the body of the control valve unit 12.

Disk valve 25 works like valve 23 and controls communication between ports 38 and 55 and is reciprocable in a cylindrical chamber 56 in which there are two telescoping coiled compression springs 31' and 32' similar to the springs 31 and 32 in chamber 33, larger outer spring 31' being the longer and relatively light and tending normally to hold the valve 25 closed, but inner and smaller spring 32' being shorter than spring 31' and substantially heavier. At the opposite end of chamber 56 from disk valve 25 is another disk valve 25' like the disk valve 25 having the same radial guide fingers 28 thereon, and this valve 25' is held normally seated by spring 31' against a closure plate 34' fastened by means of screws 35' to the valve body half 13, whereby normally to close an air relief port 36'.

In operation, any forward or rearward movement of rod 7 will cause a like forward or rearward movement of rod 14 so as to steer the boat in one direction or the other, but all of the steering force is powered by atmospheric or positive pressure on one side of the piston 49 simultaneously with application of suction or negative pressure from port 38 on the other side, the operator merely moving rod 7 one way or the other instead of applying the necessary force to the rudder 19 by manipulation of the steering wheel 5. Thus, steering is made easier and the torque on the vertical shaft 18 is never felt by the operator in handling the steering wheel 5. When rod 7 is moved to the rear, cross-head 22 unseats valve 25, placing port 55 and flexible tube 54 in communication with suction port 38, so that the rear end of cylinder 48 immediately has a reduction in pressure therein, causing the piston 49 to move rearwardly under atmospheric or positive pressure delivered concurrently to the front end of the cylinder 48 through flexible tube 47, port 30 and port 36, valve 23' being opened under the influence of atmospheric pressure acting on its left face and reduction in pressure on its right face concurrently with the opening of valve 25. The body of the control valve unit 12, being connected at 50 with the piston 49, moves rearwardly with piston 49 and the rod 14 operates the rudder 19, steering the boat to the right with power instead of by direct application of manual force to the steering wheel 5. When the body of the control valve unit 12 has shifted to the rear a distance equivalent to the rearward movement of the rod 7, valve 25 is closed and valve 23' closes simultaneously so that air is trapped in cylinder 48 in front of piston 49 while valve 25', acting under the influence of atmospheric air pressure and the lower air pressure within the rear end of cylinder 48 behind the piston 49, may crack open to admit some air, so that with the pressures acting on opposite sides of the piston 49 under steady steering conditions, spring 31' may be retained compressed so that its force keeps valve 25' closed despite the above described pressure differential, tending to open said valve, whereby to maintain piston 49 and all parts connected therewith in their new positions. As a result, the rudder 19 has been shifted from its straight ahead fore and aft plane to an angular position to steer the boat to the right, the sharpness of the turn to the right depending upon how much rearward movement was given rod 7 by a corresponding amount of turning of the steering wheel 5. If, due for example to leakage of air past the piston 49 in cylinder 48, the rudder 19 tends to return to its straight ahead fore and aft plane, it will be seen that valve 25 will be opened as a result of the forward movement of the control valve unit 12 with the rod 14, and the instant that occurs, there is a repetition of the operation above described when the rod 7 was described as being moved to the rear, when cross-head 22 unseated the valve 25, so that once a given setting for the rudder 19 is selected by operation of the steering wheel 5, that setting is maintained automatically until the operator turns the steering wheel again. After the turn has been made and the steering wheel 5 is turned back to its original position for straight ahead travel, the forward movement of rod 7 unseats valve 23, thereby placing port 30 and flexible tube 47 in communication with suction port 38 to create a reduction in pressure in the front end of cylinder 48. At the same time, valve 25 is permitted to close fully and valve 25' is opened under the influence of atmospheric air pressure acting on its right face and the reduction in pressure existing in the rear end of cylinder 48 acting on the left face of valve 25', and thus atmospheric pressure is delivered through flexible tube 54 and ports 55 and 36' to the rear end of the cylinder 48, causing the piston 49 to be moved forwardly until the body of control valve unit 12 has been restored to its normal position with respect to cross-head 22. In this forward movement of the body of the control valve unit 12 the rod 14 is, of course, moved forwardly also and rudder 19 is thereby restored to its straight ahead position. The response to forward or rearward movement of cross-head 22 is instantaneous, so that it is not a matter of the cross-head moving and the body of the control valve unit 12 moving thereafter; both parts move together, the control valve unit 12 shifting forwardly and rearwardly with the rod 7 as a servo-mechanism. If anything happens so that the power steering is not available temporarily until the difficulty has been corrected, the boat is not left without steering means, because it is obvious that the cross-head 22 has only a slight amount of lost motion with respect to the chamber 21 in the body of the control valve unit 12 (¼" approximately), so that a forward or rearward movement of rod 7 can be transmitted directly to rod 14 manually independently of the power steering mechanism. In passing, the reason the shorter but heavier inner coiled compression springs 32 and 32' are provided in connection with the lighter and longer outer coiled compression springs 31 and 31' is that the springs 31 and 31' serve to close the disk valves gently and quietly but are not strong enough to maintain a minimum spaced relationship between valves 23 and 23' and between valves 25 and 25', and, therefore, springs 32 and 32', which do not enter into the operation of the control valve unit 12 under normal conditions, serve as combination spacers and shock absorbers between these disk valves. The lighter and longer outer springs, it will be noticed, are of one hand while the heavier and shorter inner springs are of the opposite hand so as to minimize likelihood of any mechanical interference of one spring with the other in either of the chambers 33 and 56.

Referring to FIGS. 3 and 4, the power shifting mechanism illustrated here may be provided alone or with the power steering mechanism shown in FIGS. 1 and 2. The arm 57 oscillates a shaft 58 to operate a shifter fork inside the transmission housing 59 provided in connection with the engine 42a to drive propeller shaft 60 selectively in either direction and at different speeds depending upon the setting of the arm 57 in a predetermined way. At 12a is a control valve unit like unit 12 of FIGS. 1 and 2 into which the rod 7a, that is reciprocable by oscillation of a shift lever 5a, extends for connection with a cross-head 22, similarly as shown in FIG. 2, the rod 14a extending rearwardly from the body of the control valve unit 12a, similarly as rod 14 in FIG. 1, being here shown as pivotally connected at its rear end, as at 61, to the outer end of arm 57 together with the outer end of the piston rod 50a of the piston 49a that operates in the vacuum cylinder 48a that corresponds with the cylinder 48 of FIG. 1. There are the same flexible hose connections in this power shifting mechanism as in the power steering mechanism of FIGS. 1 and 2, namely, flexible tubular connections 39a, 47a, and 54a, connection 39a being between the intake manifold 43 and the port 38 of the control valve unit 12a, there being no need in the case of power shifting for a storage tank 40 and booster pump 45, due to the fact that the engine 42 is idling at the time of shifting and there being usually ample vacuum available under those conditions, without booster means. However, in a case where both power steering and power shifting is employed, the connection 39a would communicate with the storage tank 40. Connection 47a is between port 30 of control valve unit 12a and the front end of cylinder 48a, and connection 54a is between port 55 of control valve unit 12a and the rear end of cylinder 48a, this end of the cylinder being pivotally connected at 52a with a supporting bracket 53a suitably mounted in the rear end of the boat 41a.

In conclusion, it should be clear that the same servo operation of rods 14a and 50a is obtained in response to manual reciprocation of shifter rod 7a for power shifting as is obtained in power steering, as described above.

It is believed the foregoing description conveys a good understanding of the objects and advantages of my invention. The appended claims have been drawn to cover all legitimate modifications and adaptations.

I claim:

1. In a steering mechanism for a vehicle having an internal combustion engine provided with an intake manifold, a manually reciprocable first steering rod having a valve tappet operable thereby, a second steering rod parallel to the first steering rod and reciprocable in response to manual operation thereof and operatively connected with a steering part of the vehicle to be operated, a control valve body fixed to and movable with the second steering rod in either direction, manually operable valve means in said valve body operable in either direction by the aforesaid valve tappet on the first steering rod, a vacuum cylinder mounted in a fixed spaced relation to said valve body and having a piston reciprocable therein connected with said valve body to shift it and the second steering rod with it in either direction in response to corresponding movement of the first steering rod, a flexible conduit connecting said intake manifold with a suction port provided in said valve body, two other flexible conduits connecting opposite ends of said cylinder with two other ports provided in said valve body, either of which may be placed in communication with the suction port by tappet operation one way or the other of the aforesaid manually operable valve means in said valve body, and positive and negative pressure responsive valve means in said valve body operable simultaneously for controlling communication between the two last mentioned ports and the atmosphere, whereby either end of the cylinder can be vented to atmosphere when the other end of the cylinder is subjected to suction from the intake manifold of said engine.

2. A steering mechanism as set forth in claim 1 wherein the control valve body has one end of the first steering rod reciprocable therein and carrying the tappet for operation of the manually operable valve means in said valve body, whereby said first steering rod has a lost motion operating connection through the valve body with the second steering rod, so that the second steering rod may be moved endwise in either direction by the first steering rod independently of power operation.

3. A steering mechanism as set forth in claim 1 including a vacuum storage tank inserted in the flexible hose connection between the suction port of the valve body and the intake manifold of the engine, and a vacuum booster pump interposed between the storage tank and the intake manifold and operated by power independently of the operation of the engine.

4. A steering mechanism as set forth in claim 1 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions.

5. A steering mechanism as set forth in claim 1 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber.

6. A steering mechanism as set forth in claim 1 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber, the second spring being of heavier loading than the first spring.

7. A steering mechanism as set forth in claim 1 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber, the second spring being of opposite hand in relation to the first spring.

8. In a gear shifting mechanism for a vehicle having an internal combustion engine provided with an intake manifold, a manually reciprocable first shifting rod having a valve tappet operable thereby, a second shifting rod parallel to the first shifting rod and reciprocable in response to manual operation thereof and operatively connected with a shifting part of the vehicle to be operated, a control valve body fixed to and movable with the second shifting rod in either direction, manually operable valve means in said valve body operable in either direction by the aforesaid valve tappet on the first shifting rod, a vacuum cylinder mounted in a fixed spaced relation to said valve body and having a working piston reciprocable therein connected with said valve body to shift it and the second shifting rod with it in either direction in response to corresponding movement of the first shifting rod, a flexible conduit connecting said intake manifold with a suction port provided in said valve body, two other flexible conduits connecting opposite ends of said cylinder with two other ports provided in said valve body, either of which may be placed in communication with the suction port by tappet operation one way or the other of the aforesaid manually operable valve means in said valve body, and positive and negative pressure responsive valve means in said valve body operable simultaneously for controlling communication between the two last mentioned ports and the atmosphere, whereby either end of the cylinder can be vented to atmosphere when the other end of the cylinder is subjected to suction from the intake manifold of said engine.

9. A gear shifting mechanism as set forth in claim 8 wherein the control valve body has one end of the first shifting rod reciprocable therein and carrying the tappet for operation of the manually operable valve means in said valve body, whereby said first shifting rod has a lost motion operating connection through the valve body with the second shifting rod, so that the second shifting rod may be moved endwise in either direction by the first shifting rod independently of power operation.

10. A gear shifting mechanism as set forth in claim 8 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions.

11. A gear shifting mechanism as set forth in claim 8 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber.

12. A gear shifting mechanism as set forth in claim 8 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber, the second spring being of heavier loading than the first spring.

13. In a combination steering mechanism and gear shifting mechanism for a vehicle having an internal combustion engine provided with an intake manifold, the combination in each of said mechanisms of a manually reciprocable first rod having a valve tappet operable thereby, a second rod parallel to the first rod and reciprocable in response to manual operation thereof and operatively connected with a part of the vehicle to be operated, a control valve body fixed to and movable with the second rod in either direction, manually operable valve means in said valve body operable in either direction by the aforesaid valve tappet on the first rod, a vacuum cylinder mounted in a fixed spaced relation to said valve body and having a piston reciprocable therein connected with said valve body to shift it and the second rod with it in either direction in response to corresponding movement of the first rod, a flexible conduit connecting said intake manifold with a suction port provided in said valve body, two other flexible conduits connecting opposite ends of said cylinder with two other ports provided in said valve body, either of which may be placed in communication with the suction port by tappet operation one way or the other of the aforesaid manually operable valve means in said valve body, and positive and negative pressure responsive valve means in said valve body operable simultaneously controlling communication between the two last mentioned ports and the atmosphere, whereby either end of the cylinder can be vented to atmosphere when the other end of the cylinder is subjected to suction from the intake manifold of said engine.

14. A combination steering mechanism and gear shifting mechanism as set forth in claim 13 wherein the control valve body has one end of the first rod reciprocable therein and carrying the tappet for operation of the manually operable valve means in said valve body, whereby said first rod has a lost motion operating connection through the valve body with the second rod, so that the second rod may be moved endwise in either direction by the first rod independently of power operation.

15. A combination steering mechanism and gear shifting mechanism as set forth in claim 13 including a vacuum storage tank inserted in the flexible hose connection between the suction port of the valve body and the intake manifold of the engine, and a vacuum booster pump interposed between the storage tank and the intake manifold and operated by power independently of the operation of the engine.

16. A mechanism as set forth in claim 13 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions.

17. A mechanism as set forth in claim 13 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber.

18. A mechanism as set forth in claim 13 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber, the second spring being of heavier loading than the first spring.

19. A mechanism as set forth in claim 13 wherein the manually operable valve means comprises two valves and the pressure responsive valve means comprises two valves, the mechanism including a single coiled compression spring between each of the first mentioned manually operable valves and a pressure responsive valve serving normally to press said valves apart toward their closed positions, and a shorter coiled compression spring of smaller diameter disposed inside the first mentioned spring serving both as a stop and shock absorber, the second spring being of opposite hand in relation to the first spring.

20. In a servo mechanism operable by atmospheric pressure, the combination with a source of suction or vacuum, of a manually reciprocable first rod having a valve tappet operable thereby, a second rod parallel to the first rod and reciprocable in response to manual operation thereof and operatively connected with a part to be operated, a control valve body fixed to and movable with the second rod in either direction, manually operable valve means in said valve body operable in either direction by the aforesaid valve tappet on the first rod, a working cylinder mounted in a fixed spaced relation to said valve body and having a piston reciprocable therein connected with said valve body to shift it and the second rod with it in either direction in response to corresponding movement of the first rod, a flexible conduit connecting said intake manifold with a suction port provided in said valve body, two other flexible conduits connecting opposite ends of said cylinder with two other ports provided in said valve body, either of which may be placed in communication with the suction port by tappet operation one way or the other of the aforesaid manually operable valve means in said valve body, and positive and negative pressure responsive valve means in said valve body operable simultaneously for controlling communication between the two last mentioned ports and the atmosphere, whereby either end of the cylinder can be vented to atmosphere when the other end of the cylinder is subjected to suction from the source of suction or vacuum.

21. A servo mechanism as set forth in claim 20 wherein the control valve body has one end of the first rod reciprocable therein and carrying the tappet for operation of the manually operable valve means in said valve body, whereby said first rod has a lost motion operating connection through the valve body with the second rod, so that the second rod may be moved endwise in either direction by the first rod independently of power operation.

22. In a steering mechanism for a vehicle, a manually reciprocable first steering rod having a valve tappet operable thereby, a second steering rod parallel to the first steering rod and reciprocable in response to manual operation thereof and operatively connected with a steering part of the vehicle to be operated, a control valve body fixed to and movable with the second steering rod in either direction, manually operable valve means in said valve body operable in either direction by the aforesaid valve tappet on the first steering rod, a working cylinder mounted in a fixed spaced relation to said valve body and having a working piston reciprocable therein connected with said valve body to shift it and the second steering rod with it in either direction in response to corresponding movement of the first steering rod, means providing a source of pressure fluid supply for operating said piston selectively in either direction accordingly as said valve tappet is operated, said valve body having ports provided therein, said working cylinder having ports provided therein on opposite sides of said piston, and flexible conduits interconnecting these ports for operation under fluid pressure of said working piston in either direction simultaneously with and in the same direction as said first mentioned rod.

23. A steering mechanism as set forth in claim 22 wherein the control valve body has one end of the first steering rod reciprocable therein and carrying the tappet for operation of the manually operable valve means in said valve body, whereby said first steering rod has a lost motion operating connection through the valve body with the second steering rod, so that the second steering rod may be moved endwise in either direction by the first steering rod independently of power operation.

24. In a gear shifting mechanism for a vehicle, a manually reciprocable first shifting rod having a valve tappet operable thereby, a second shifting rod parallel to the first shifting rod and reciprocable in response to manual operation thereof and operatively connected with a shifting part of the vehicle to be operated, a control valve body fixed to and movable with the second shifting rod in either direction, manually operable valve means in said valve body operable in either direction by the aforesaid valve tappet on the first shifting rod, a working cylinder mounted in a fixed spaced relation to said valve body and having a working piston reciprocable therein connected with said valve body to shift it and the second shifting rod with it in either direction in response to corresponding movement of the first shifting rod, means providing a source of pressure fluid supply for operating said piston selectively in either direction accordingly as said valve tappet is operated, said valve body having ports provided therein, said working cylinder having ports provided therein on opposite sides of said piston, and flexible conduits inter-connecting these ports for operation under fluid pressure of said working piston in either direction simultaneously with and in the same direction as said first mentioned rod.

25. A gear shifting mechanism as set forth in claim 24 wherein the control valve body has one end of the first shifting rod reciprocable therein and carrying the tappet for operation of the manually operable valve means in said valve body, whereby said first shifting rod has a lost motion operating connection through the valve body with the second shifting rod, so that the second shifting rod may be moved endwise in either direction by the first shifting rod independently of power operation.

26. In a combination steering mechanism and gear shifting mechanism for a vehicle, the combination in each of said mechanisms of a manually reciprocable first rod having a valve tappet operable thereby, a second rod parallel to the first rod and reciprocable in response to manual operation thereof and operatively connected with a part of the vehicle to be operated, a control valve body fixed to and movable with the second rod in either direction, manually operable valve means in said valve body operable in either direction by the aforesaid valve tappet on the first rod, a working cylinder mounted in a fixed spaced relation to said valve body and having a piston reciprocable therein connected with said valve body to shift it and the second rod with it in either direction in response to corresponding movement of the first rod, means providing a source of pressure fluid supply for operating said piston selectively in either direction accordingly as said valve tappet is operated, said valve body having ports provided therein, said working cylinder having ports provided therein on opposite sides of said piston, and flexible conduits interconnecting these ports for operation under fluid pressure of said working piston in either direction simultaneously with and in the same direction as said first mentioned rod.

27. A combination steering mechanism and gear shifting mechanism as set forth in claim 26 wherein the control valve body has one end of the first rod reciprocable therein and carrying the tappet for operation of the manually operable valve means in said valve body, whereby said first rod has a lost motion operating connection through the valve body with the second rod, so that the second rod may be moved endwise in either direction by the first rod independently of power operation.

28. In a servo mechanism operable by fluid pressure, the combination of a manually reciprocable first rod having a valve tappet operable thereby, a second rod parallel to the first rod and reciprocable in response to manual operation thereof and operatively connected with a part to be operated, a control valve body fixed to and movable with the second rod in either direction, manually operable valve means in said valve body operable in either direction by the aforesaid valve tappet on the first rod, a working cylinder mounted in a fixed spaced relation to said valve body and having a piston reciprocable therein connected with said valve body to shift it and the second rod with it in either direction in response to corresponding movement of the first rod, means providing a source of fluid supply for operating said piston selectively in either direction accordingly as said valve tappet is operated, said valve body having ports provided therein, said working cylinder having ports provided therein on opposite sides of said piston, and flexible conduits interconnecting these ports for operation under fluid pressure of said working piston in either direction simultaneously with and in the same direction as said first mentioned rod.

29. A servo mechanism as set forth in claim 28 wherein the control valve body has one end of the first rod reciprocable therein and carrying the tappet for operation of the manually operable valve means in said valve body, whereby said first rod has a lost motion operating connection through the valve body with the second rod, so that the second rod may be moved endwise in either direction by the first rod independently of power operation.

References Cited in the file of this patent

UNITED STATES PATENTS

| | | |
|---|---|---|
| 1,947,895 | Bragg et al. | Feb. 20, 1934 |
| 2,043,732 | Bragg et al. | June 9, 1936 |
| 2,565,929 | Onde | Aug. 28, 1951 |
| 2,685,342 | Lauck | Aug. 3, 1954 |